(12) United States Patent
Lang (10) Patent No.: US 7,543,878 B2
(45) Date of Patent: Jun. 9, 2009

(54) ROLL-BAR SYSTEM FOR MOTOR VEHICLES COMPRISING A RETRACTABLE ROOF

(75) Inventor: Jozsef Lang, Budapest (HU)

(73) Assignee: ISE Innomotive Systems Europe GmbH, Bergneustadt (DE)

( * ) Notice: Subject to any disclaimer, the term of this patent is extended or adjusted under 35 U.S.C. 154(b) by 101 days.

(21) Appl. No.: 11/632,598

(22) PCT Filed: May 28, 2005

(86) PCT No.: PCT/EP2005/005745

§ 371 (c)(1),
(2), (4) Date: Jan. 16, 2007

(87) PCT Pub. No.: WO2006/007898

PCT Pub. Date: Jan. 26, 2006

(65) Prior Publication Data

US 2007/0205593 A1    Sep. 6, 2007

(30) Foreign Application Priority Data

Jul. 20, 2004    (DE)    ........................ 10 2004 035 015

(51) Int. Cl.
  *B60R 21/13*    (2006.01)
(52) U.S. Cl. ...................... 296/68.1; 280/756
(58) Field of Classification Search .............. 296/68.1, 296/107.03; 280/756
See application file for complete search history.

(56) References Cited

U.S. PATENT DOCUMENTS

| | | | | |
|---|---|---|---|---|
| 3,885,810 A | * | 5/1975 | Chika | ........................ 280/748 |
| 5,110,185 A | * | 5/1992 | Schmutz et al. | ............. 297/410 |
| 5,267,769 A | * | 12/1993 | Bonne et al. | ........... 296/107.08 |
| 5,626,361 A | * | 5/1997 | Heiner | ........................ 280/756 |
| 5,671,947 A | * | 9/1997 | Henn | ......................... 280/756 |
| 5,944,375 A | * | 8/1999 | Schenk et al. | ................ 296/108 |

(Continued)

FOREIGN PATENT DOCUMENTS

DE    38 26 788    2/1990

(Continued)

*Primary Examiner*—Glenn Dayoan
*Assistant Examiner*—Paul A Chenevert
(74) *Attorney, Agent, or Firm*—Hudak, Shunk & Farine Co. LPA (57) ABSTRACT

The invention relates to a roll-bar system for vehicles comprising a roof, which can be retracted and raised in a motor-driven manner by a roof-displacement mechanism. The system consists of a roll-bar body that is associated with each seat and does not comprise a sensor-controlled crash drive. The body can be forcibly displaced autonomously, in conjunction with the roof-displacement mechanism, between a first rigid position, when the roof is closed, and a second raised, rigid position, when the roof is open. The aim of the invention is to raise the rigid roll-bar system into the respective rigid positions in a kinematically simple, forcibly guided manner. To achieve this, the roll-bar body is mounted and guided in a cassette-type housing that is fixed to the vehicle and the body is associated with a drive, which is coupled to the roof-displacement mechanism and used to displace the body vertically in the housing and with a position-dependent forcibly guided locking device, which is used to lock the body in the raised position.

10 Claims, 9 Drawing Sheets

U.S. PATENT DOCUMENTS

| | | | |
|---|---|---|---|
| 6,322,130 B1 * | 11/2001 | Wanden et al. | 296/107.01 |
| 6,805,378 B2 * | 10/2004 | Berges et al. | 280/756 |
| 6,902,190 B2 * | 6/2005 | Nass | 280/756 |
| 7,156,446 B2 * | 1/2007 | Perakis | 296/107.2 |
| 7,341,278 B2 * | 3/2008 | Queveau et al. | 280/756 |
| 7,384,067 B2 * | 6/2008 | Parks et al. | 280/756 |
| 7,481,458 B2 * | 1/2009 | Bunsmann et al. | 280/756 |
| 7,481,476 B2 * | 1/2009 | Heiss et al. | 296/24.43 |
| 2003/0042722 A1 * | 3/2003 | Hovelmann et al. | 280/756 |
| 2003/0178833 A1 * | 9/2003 | Muller | 280/756 |
| 2006/0290125 A1 * | 12/2006 | Kasubke | 280/756 |
| 2006/0290126 A1 * | 12/2006 | Kohlem et al. | 280/756 |
| 2007/0057500 A1 * | 3/2007 | Bunsmann et al. | 280/756 |
| 2008/0122210 A1 * | 5/2008 | Liesaus et al. | 280/756 |
| 2008/0197613 A1 * | 8/2008 | Latussek | 280/756 |
| 2009/0020994 A1 * | 1/2009 | Liesaus | 280/756 |

FOREIGN PATENT DOCUMENTS

| | | |
|---|---|---|
| DE | 43 42 400 | 2/1995 |
| DE | 44 25 954 | 11/1995 |
| DE | 197 52 068 | 5/1999 |
| DE | 198 38 989 | 11/1999 |
| DE | 100 40 642 | 9/2001 |
| DE | 600 01 224 | 9/2003 |
| EP | 459213 A1 * | 12/1991 |
| EP | 504482 A1 * | 9/1992 |
| EP | 608794 A1 * | 8/1994 |
| EP | 1 084 914 | 3/2001 |
| JP | 63180536 A * | 7/1988 |
| WO | 2004/026628 | 4/2004 |

* cited by examiner

ROLL-BAR SYSTEM FOR MOTOR VEHICLES COMPRISING A RETRACTABLE ROOF

FIELD OF THE INVENTION

The invention pertains to a roll-bar system for motor vehicles with a roof, which can be extended and retracted in motorized fashion by means of a roof displacement mechanism, consisting of a roll-bar body that is associated with each seat and does not comprise a sensor-controlled crash drive, which can be forcibly displaced autonomously, in conjunction with the roof displacement mechanism, between a first rigid position, when the roof is closed, and a second, raised rigid position, when the roof is open.

BACKGROUND OF THE INVENTION

Such roll-bar systems are used to protect the passengers in motor vehicles without a protective roof, typically in convertibles or sports cars during a roll-over, so that the vehicle can roll over onto the upwardly projecting roll-bar body.

It is known how to provide a permanently installed roll bar spanning the entire width of the vehicle. In this solution, the increased wind drag and the occurrence of driving noise is perceived as a drawback, apart from impairing the appearance of the vehicle.

It is also known how to assign a so-called constant-height, rigid, vertically upwardly projecting roll bar to each seat of the vehicle. This solution is typically used in sports cars to underscore the sporty appearance, but it is also used in convertibles.

Also widespread in convertibles are structural solutions in which, as an alternative to the rigid roll bars, the roll-bar body is retracted in the normal condition, and in the event of an accident, i.e., during an impending roll-over, it is quickly extended into a protecting position, in order to prevent the passengers from being crushed by the overturned vehicle.

These roll-bar systems typically have a U-shaped roll-bar body or one made of other profiled sections, guided in a guide body fixed to the vehicle, the guide body being secured in a cassette-type housing. This roll-bar body in the normal condition is held in a lower position of rest by a holding device against the biasing force of at least one actuating compression spring, and in the event of a roll-over a sensor releases the holding device and the force of the actuating compression spring can bring it into an upper, protecting position, and then a locking device, or retraction brake, is engaged and prevents the roll bar from being pushed in. This so-called crash drive in the form of the actuating compression spring can also be combined with a continuously displaceable drive, the so-called comfort drive.

Typically, each seat in the vehicle is assigned a cassette, especially the front seats. In the rear, the cassettes can also be integrated in a rear wall structural unit. Such a cassette type construction of a roll-bar system with a U-shaped roll bar is presented, for example, by DE 43 42 400 A 1; an alternative cassette construction with a roll-bar body in the form of a profiled body is shown, in particular, by DE 198 38 989 C1.

The invention is based on the roll-bar system which is rigid relative to the vehicle seats.

Yet in sports cars with retractable roof (top), and also in convertibles in any case, one must take into account the rigid, upwardly projecting roll-bar body, since the top has to travel over it. In particular during the presently popular automatic opening and closing movement of the top, the upwardly projecting roll-bar body must not hinder the path of movement of the top.

But since the height of the roof is limited by reasons of design, as well as engineering (especially the $C_w$, a drag coefficient value), the height of the roll-bar tangent, dictated by the upwardly projecting dimension of the roll-bar body, is also limited, which necessitates a compromise between the structural requirements, on the one hand, and passenger protection, on the other.

From DE 44 25 954 C1 there is known a roll-bar system for motor vehicles with retractable roof, having a roll bar providing sufficient passenger protection with either an open or a closed roof, and not hindering the path of movement of the roof either when opening or closing, since the roll bar is placed in a lower setting position when the roof is closed and in an upper setting position when the roof is opened, having a lift mechanism provided for the movement of the roll bar between the lower and the upper setting position, being connected by means of a forcible mechanical guidance to the control mechanism provided for opening or closing of the roof.

This known roll bar has the benefits of a rigid roll bar, since it cannot be fully retracted into the car body, but instead can only move between two raised positions, both of which offer sufficient protection to a person situated in the particular vehicle seat. Because the roll bar is in a lower raised position when the roof is closed, it is possible to design a stable and aerodynamic roof, so that the closed roof merges elegantly in the overall vehicle contour and also the somewhat lowered roll bar means that the roof can be drawn more shallowly across the passenger compartment by design. The forcible mechanical guidance of the setting and lifting mechanism accomplishes a forcible linkage between the particular setting position of the roll bar and the opening or closing movement of the roof.

In the known application, the mechanical lifting mechanism for placing the roll bar, accommodated in a sleeve-like stowage, into the two raised positions by means of a bar lever is linked mechanically and frictionally to the control mechanism for the roof movement via a roof lever. The bar lever itself is connected via a transmission rod with a link guidance in the sleeve-like stowage to the roll bar at a link block.

The mechanical lifting mechanism for adjusting the height of the roll bar, i.e., for raising and lowering the roll bar in the vertical plane into the two raised positions and its mechanical coupling to the mechanical forcible guidance mechanism, mechanically actuated by the roof control mechanism, produces a highly complex kinematic construction with high installation and adjustment expense, and what is more it is prone to malfunctions.

DE 600 01 224 T2 shows a roll bar for a convertible with folding roof, not consisting, as is usual, of a naturally rigid single-piece bar, but rather of two bar elements linked at the tips of the bar, the lower free ends of each bar element being able to move between two positions by means of a frictional roller, having an interior thread, along a horizontal slideway by means of a spindle drive, coupled to the roof displacement mechanism. In the first position, the free ends are at a distance from each other, so that the linked connection and thus the tip of the bar is lowered and thus the roof can move freely. In the second position, which is adopted when the roof is opened, the free ends lie closer to each other, so that the bar elements are raised relatively steeply and the bar has the necessary height to provide protection.

However, due to the upper link of the two-element roll bar the strength of the roll bar is quite substantially impaired.

What is more, during a roll-over the two frictional rollers with the interior thread in connection to the actuating spindle need to absorb the large forces, which require a corresponding expensive dimensioning of these elements.

DE 197 52 068 A1 discloses a roll-bar system for a motor vehicle with a multipart folding roof, consisting of a front roof element, which is hinged to the car structure and able to fold into a stowage position toward the rear, and a rear roof element, hinged to the rear. The front roof element is pivoted on the car structure by two roof pillars, arranged at opposite sides, and the side roof pillars can be guided further downward via the pivot axes on the car structure to form a roll bar extending across the width of the vehicle with two U-shaped bar segments associated with the seats. The arrangement is such that the roll bar in the stowage position of the front roof element is forced to adopt its upward lying, protecting position.

This known system requires, first of all, a costly roof construction, prone to malfunction, and second, the two linkages of the roof pillars on the car structure must absorb the large forces during a roll-over, which necessitates a correspondingly strong design of the linkage, which can impair the appearance of the vehicle. Moreover, the swivel movement of the roll bar about the transverse axis requires a correspondingly large structural space, which is in scarce supply as it is for vehicles having an open roof.

SUMMARY OF THE INVENTION

The basic problem of the invention is, starting from the above-indicated, known roll-bar system for motor vehicles with retractable roof, to significantly simplify the latter in regard to the raising and lifting mechanism and the forcible guidance mechanism with the roof controls, i.e., to avoid a complex kinematic construction as in the known instance.

The solution of this problem, according to the invention, in a roll-bar system for motor vehicles with a roof, which can be extended and retracted in motorized fashion by means of a roof displacement mechanism, consisting of a roll-bar body that is associated with each seat and does not comprise a sensor-controlled crash drive, which can be forcibly displaced autonomously, in conjunction with the roof displacement mechanism, between a first rigid position, when the roof is closed, and a second, raised rigid position, when the roof is open, is that the roll-bar body is mounted and guided in a cassette type housing that is fixed to the vehicle and said body is associated with a drive, which is coupled to the roof displacement mechanism and used to displace said body vertically in the housing and with a position-dependent forcibly guided locking device, which is used to lock said body in the raised position.

Thanks to the steps of the invention, one achieves a kinematically uncomplicated, simple, forcibly guided raising and lowering of the roll-bar body.

Embodiments of the invention are characterized in subsidiary claims and also appear from the description of the figures.

BRIEF DESCRIPTION OF THE DRAWINGS

The invention shall be explained more closely by means of sample embodiments depicted in the drawings.

These show.

DETAILED DESCRIPTION OF THE INVENTION

Figure 1:
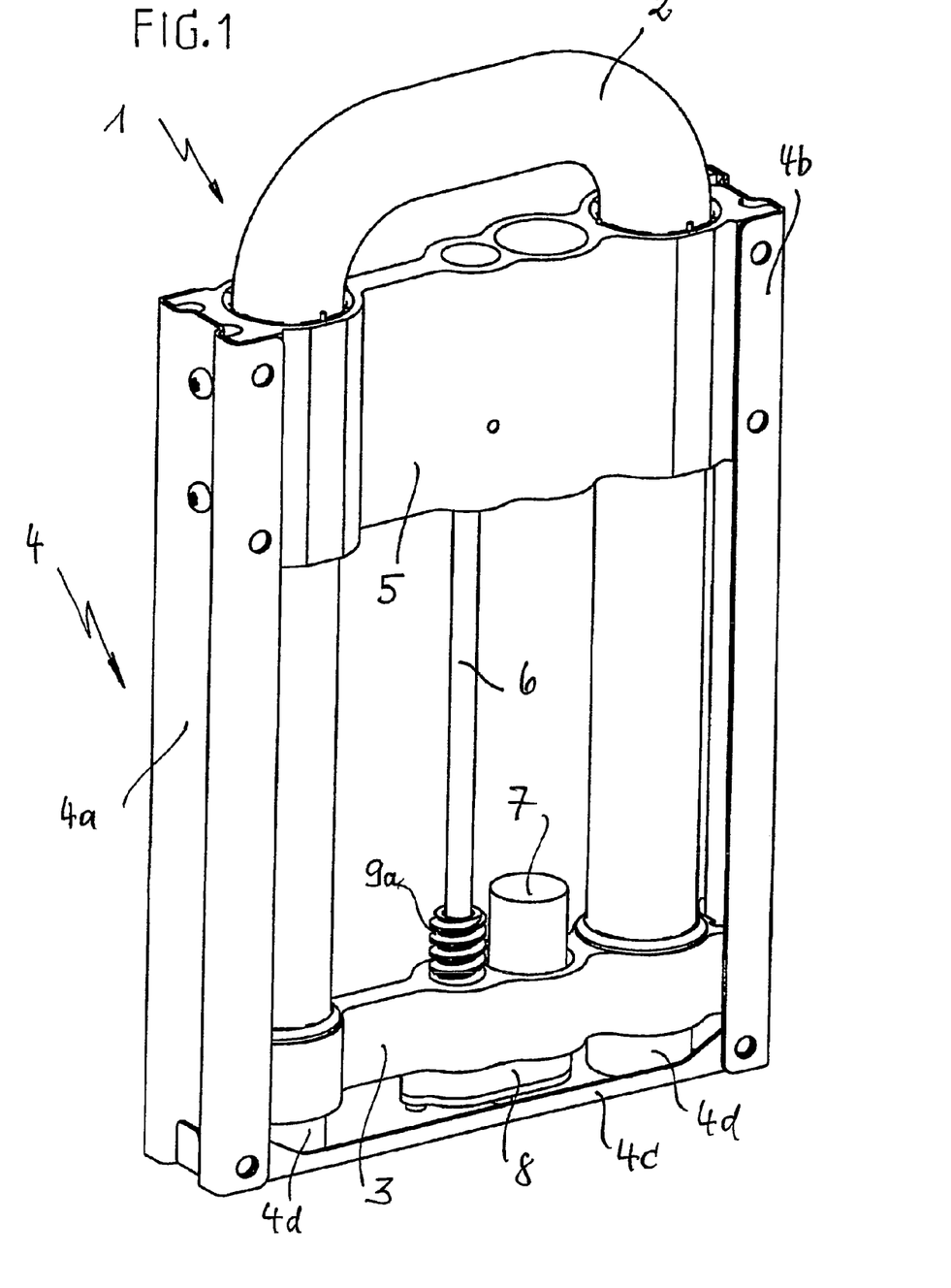
FIG. 1, in an isometric view, a first embodiment of the invention with a roll bar, guided in a cassette, which can be raised into two positions by means of an electric motor type spindle drive, electrically controlled by the roof raising mechanism, with a locking of the roll bar in its raised position with the roof opened by a double thread on the nut of the spindle drive, FIG. 2, in three longitudinal sections A-C of the system per FIG. 1, three different positions of the roll bar, FIG. 3, in an isometric view, a variant of the embodiment per FIG. 1 with the electric motor type spindle drive, but with a locking by two locking ratchets controlled according to position, FIG. 4, in seven longitudinal views A-G of the system per FIG. 3, seven different states of the roll bar and of the locking ratchets, FIG. 5, in a magnified isometric view, the position-dependent control of the locking ratchets of the system per FIG. 3 by the nut of the spindle drive, with ratchets locked in FIG. A and ratchets unlocked in FIG. B, FIG. 6, in four figure parts A-D in longitudinal section views, another embodiment of the invention with raising of the roll bar by a spring drive in conjunction with a locking by locking ratchets according to FIG. 5, as well as resetting and guiding of the roll bar by means of Bowden cable dependent on the roof displacement mechanism, showing different operating states of the system in the figure parts, and FIG. 7, likewise in four figure parts A-D in longitudinal section views, another embodiment of the invention with raising and resetting of the roll bar by a Bowden cable controlled by the roof displacement mechanism in conjunction with the locking system according to FIG. 5, likewise showing different operating states of the system in the figure parts.
Figure 2:
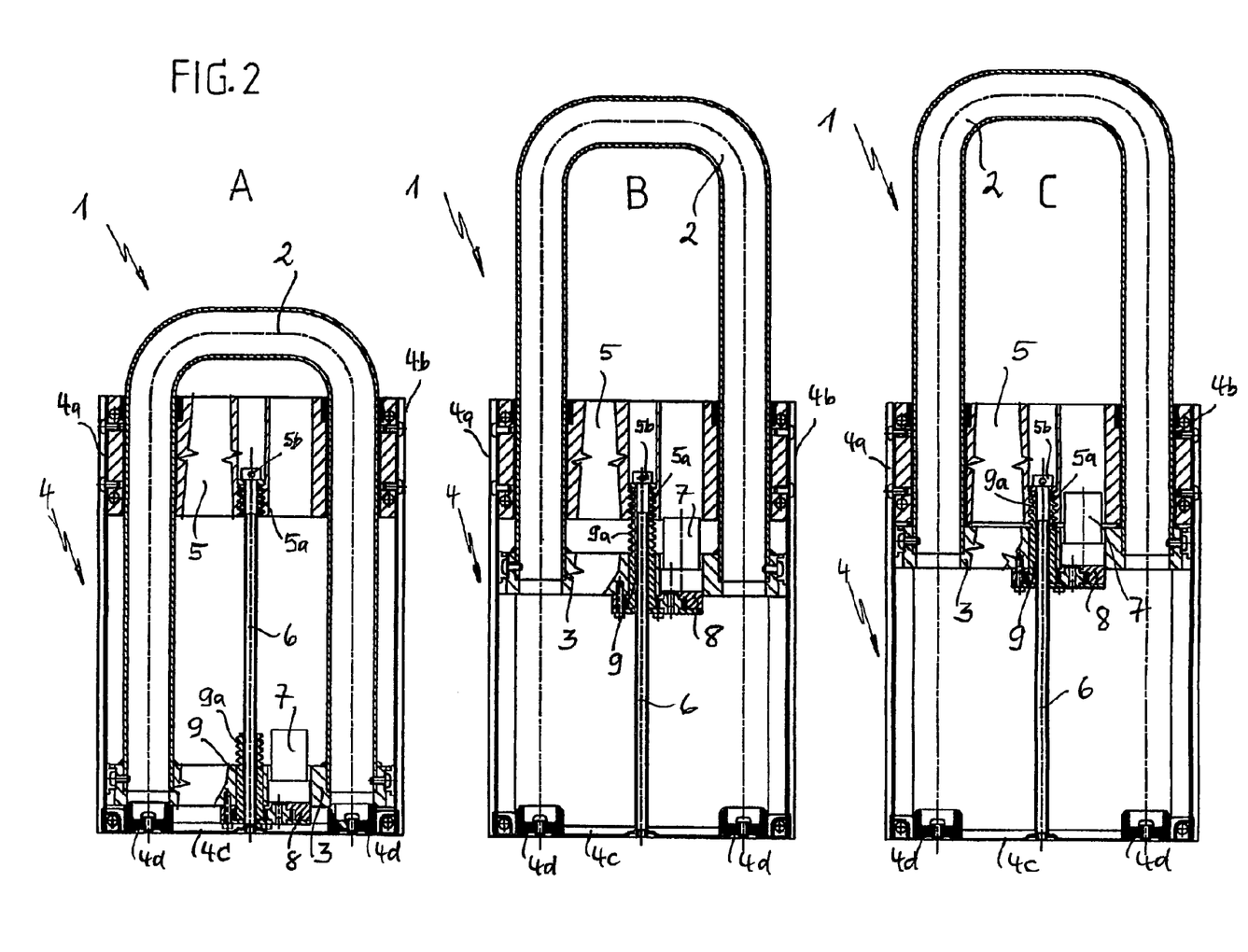

FIGS. 1 and 2 show a first sample embodiment of a seat-assigned roll-bar system according to the invention for motor vehicles with retractable roof, having a U-shaped roll bar 1, which can be raised by means of electric motor adjustment from a lower ground position with closed roof into a higher locked and raised position in dependence on the opening process of the roof, and which can also be returned to its ground position by means of the electric motor drive before the roof is closed.

Since the roll bar has no so-called crash quick drive, i.e., it cannot be raised from its respective position under sensor control in event of an impending roll-over, but instead must perform its protective function in the respective position as is, it is "related" to the rigid roll bars explained at the outset, with the distinction that it can assume two "rigid" raised positions each time.

The roll bar 1 consists of a U-shaped tube 2 with a head piece and two legs, as well as a cross arm 3, which firmly and mechanically join together the free ends of the legs.

The roll bar 1 is mounted in a cassette-type housing 4 with two essentially U-shaped side pieces 4a, 4b and a bottom piece 4c, as well as with a guide block 5 firmly arranged on the side pieces. The two legs are led into corresponding openings of the guide block, whereas the cross arm is introduced by its lateral ends into the side pieces. The housing, the guide block and the cross arm advisedly consist of extruded sections, similar to the known cassette construction per DE 100 40 642 C1 (=EP 1 182 098 A2) for systems with roll bars that can be raised into the upper protection position by means of a crash drive under sensor control.

Between the guide block 5 and the housing bottom 4c, a threaded spindle 6 is mounted so as to rotate, but not move axially. The corresponding bearings, shown only schematically in the parts of FIG. 2, e.g., the upper bearing 5b in the guide block 5, possess a conventional layout.

On the cross arm 3 is firmly mounted an electric motor 7 with transmission 8. Moreover, a nut 9, rotating in connection with the threaded spindle 6, is mounted on the cross arm so that it can rotate in connection with the transmission but not move axially.

The inner thread of the nut 9 engages with the thread of the threaded spindle 6 in such a way that the cross arm 3, and with it the roll bar 1, travels UP or DOWN on the threaded spindle 6 in dependence on the direction of turning of the electric motor.

In the lower raised position per FIG. 1 and FIG. part 2A, the cross arm 3 is basically resting on the bottom piece 4c, while the openings for the tube leg ends are accommodated free of wobble in centering pieces 4d made of elastic material, secured at the bottom, i.e., the roll bar cannot be pushed down in event of a roll-over. However, if it is in the upper raised position (FIG. part 2C), it could move downward as the threaded spindle rotates. It must therefore be locked in the upper raised position. For this, an inner thread 5a, being larger in diameter than that of the threaded spindle 6, is formed in the guide block 5, being used to lock the roll bar in the raised position by entering into a thread interaction with an outer thread 9a, matched up with the inner thread 5a in the guide block 5.

To accomplish this locking, the locking threads 5a and 9a and the thread of the threaded spindle must be coordinated with each other in regard to the thread pitch. The thread of the threaded spindle 6 can be, for example, a trapezoidal thread TR 10×2, 3-thread series, and the locking thread a trapezoidal thread TR 22×6, 1-thread series. Thus, the two threads have the same pitch per turn, which is absolutely essential so that, when the nut 9 travels up on the threaded spindle, the outer locking thread 9a of the nut can turn smoothly in the inner thread 5a in the guide block 5.

The depicted roll-bar system works as follows:

After the roof of the vehicle has been opened and stowed away in the trunk space, the electric motor 7 is placed under the vehicle voltage supply, preferably automatically, i.e., via an end switch. The threaded spindle turns and raises the roll bar 1 via the nut 9 and the cross arm 3. Shortly before the highest position (shown in FIG. 2B), the nut 9 is screwed by its external thread 9a into the guide block 5 and thus brings about the locking of the roll bar relative to the housing.

When the roof is closed once again, the electric motor at first undergoes pole reversal and is again furnished with the vehicle voltage supply, so that the roll bar is taken to its lower raised position, while the centering pieces 4d on the bottom piece 4c ensure a shock-absorbed impact of the roll bar. The roof can then be closed without hindrance from the roll bar.

Figure 3:
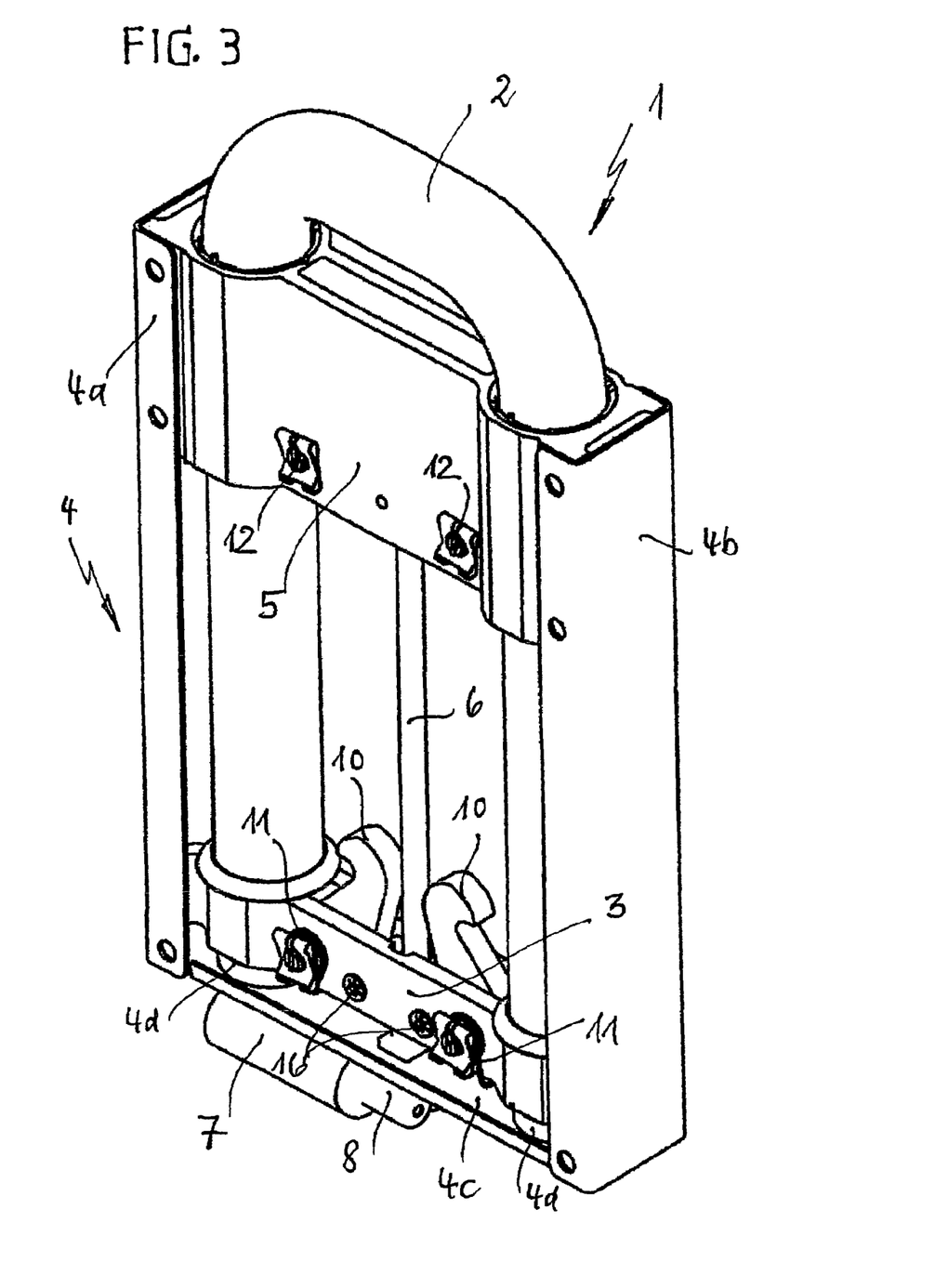
Figure 4A:
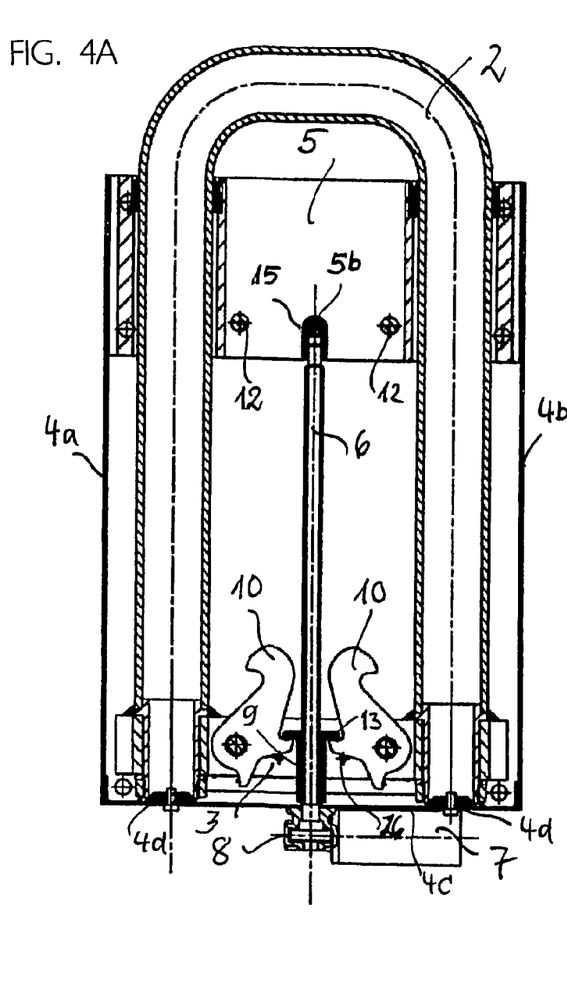
Figure 4B:
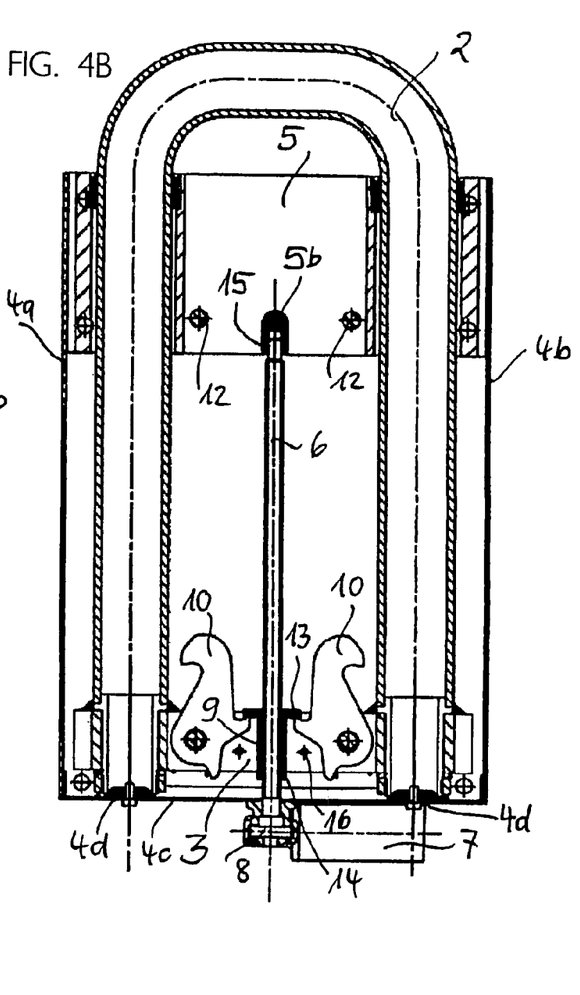
Figure 4C:
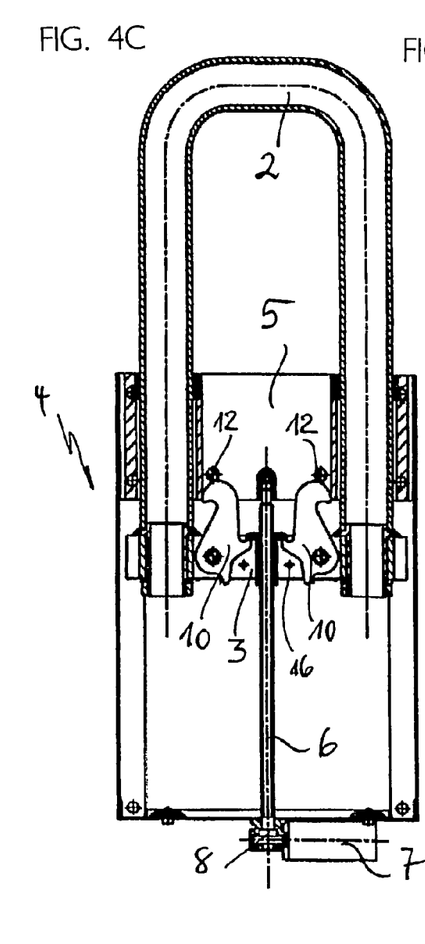
Figures 4D, 4E:
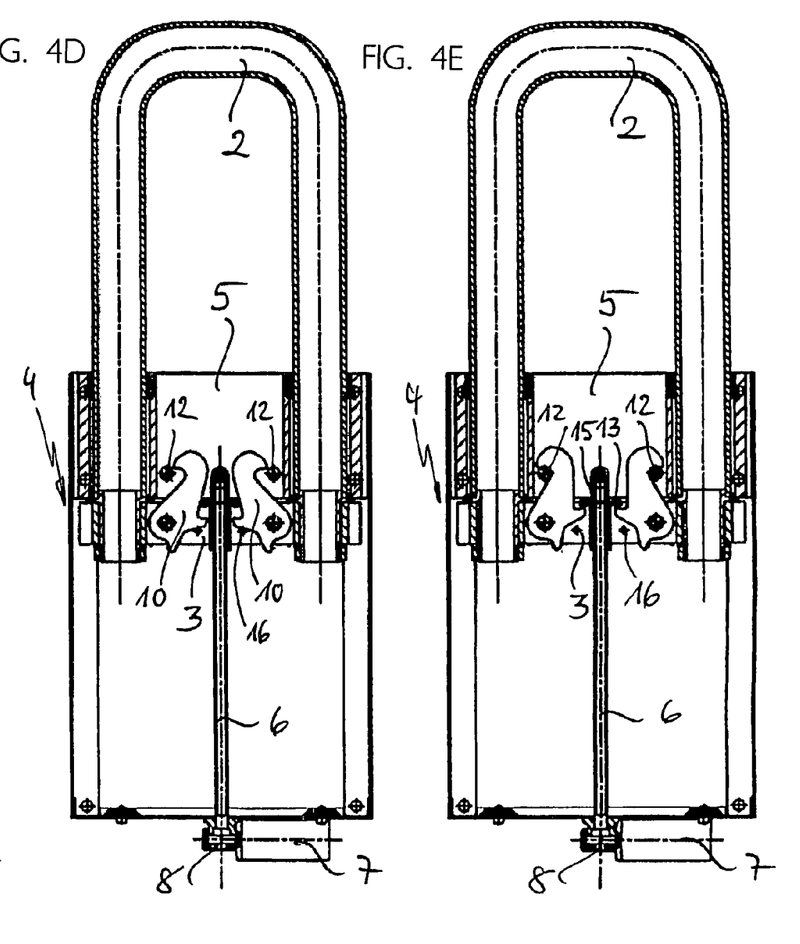
Figure 4F:
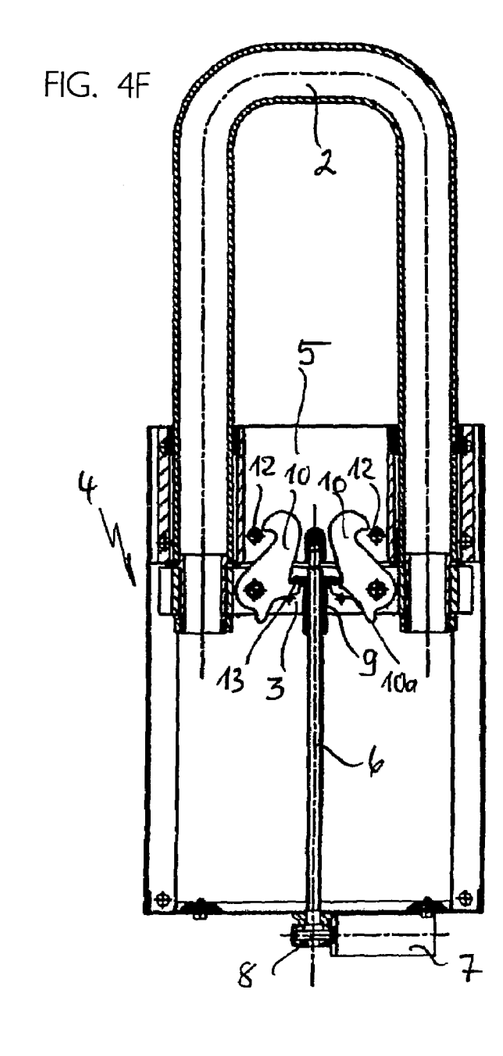
Figure 4G:
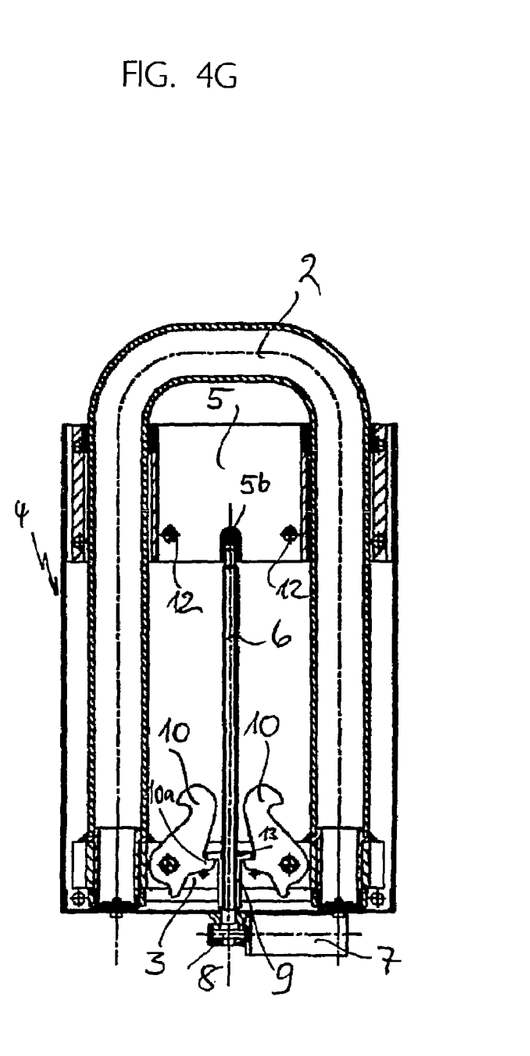
Figure 5:
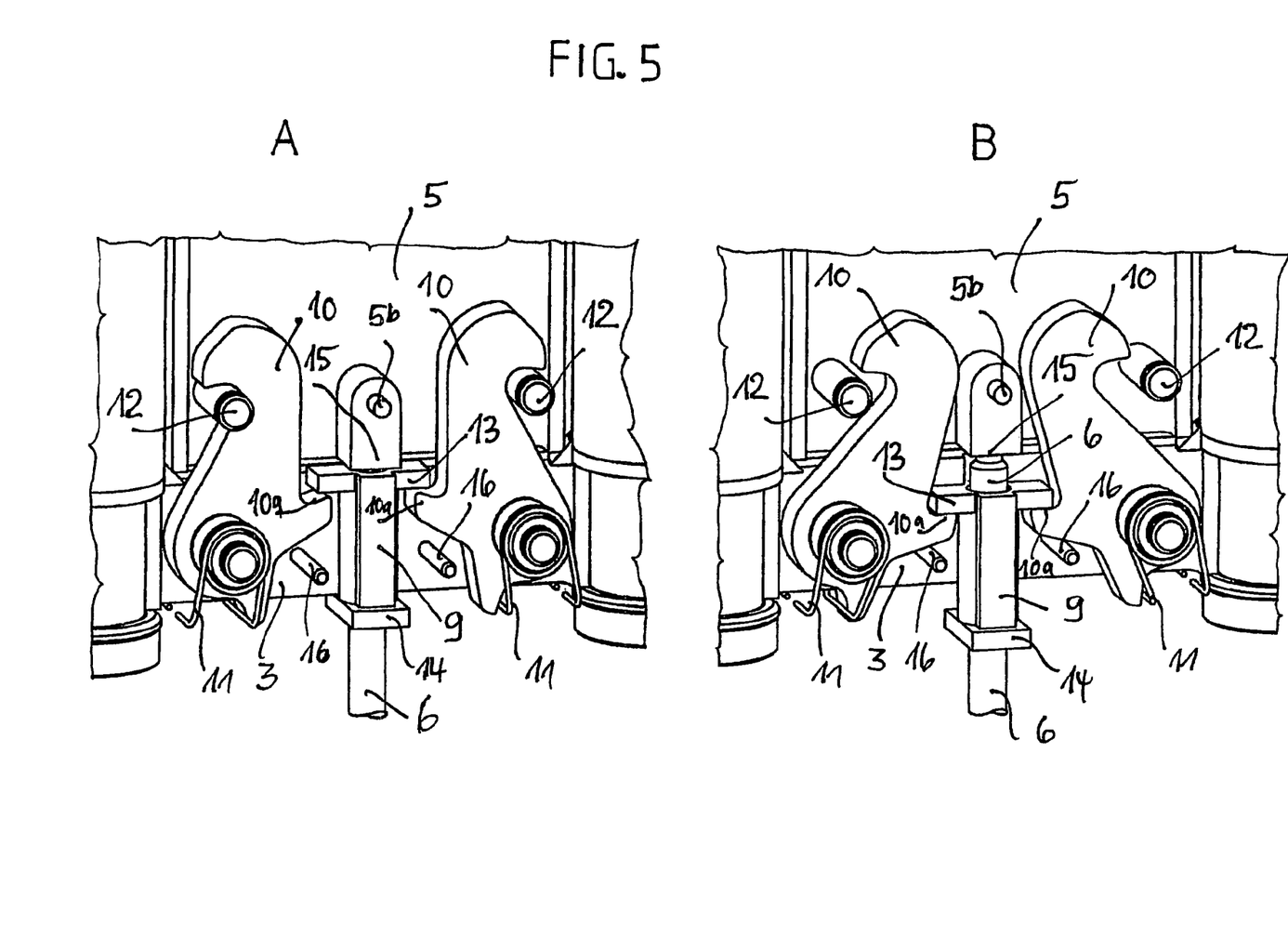

FIGS. 3 to 5 show a variant of the embodiment of FIGS. 1 and 2 with the electric motor spindle drive, which is coupled to the electrical controls of the roof, differing in particular by the mechanical locking of the roll bar situated in the raised position when the roof is open. Functionally identical parts have been given the same reference numbers.

In the present variant, the electric motor 7 with transmission 8 is mounted beneath the bottom part 4c of the cassette, firmly attached to the vehicle. The transmission 8 interacts by rotation with the threaded spindle 6, mounted in the cassette and able to rotate, but not able to move axially. The upper bearing 5b is likewise situated in the guide block 5.

The threaded spindle interacts in this variant with a T-shaped nut 9, which is mounted in the cross arm 3 of the lifting roll bar 1, firm against rotation, but able to move axially by a control stroke of around 10 mm.

Furthermore, two locking ratchets 10 are mounted on the cross arm 3 and able to pivot, each being prestressed in the locking direction by a torsion spring 11 (FIG. 5). These are supposed to prevent the roll bar 1 in the raised position from being pushed down under load, by entering into a detachable engagement with corresponding lock bolts 12, arranged in the guide block 5 and guided by the T-shaped nut 9, as shall be explained more closely by FIG. 5. FIG. 5A shows the condition of the locking in which the cross arm 3 with the locking ratchets 10 lies against the lower edge of the guide block 5, in which the locking ratchets 10 are inserted. FIG. 5B shows the release condition for subsequent retraction of the roll bar 1 via its cross arm 3.

For the activating of the locking ratchets 10 by the nut 9, the latter has an upper and a lower essentially rectangular control stop 13 and 14. The lower control stop 14 is configured or dimensioned such that it can come to lie against the cross arm 3 (FIG. 5A), but not be inserted into the hollow profile of the cross arm 3. The upper control stop 13 is staggered at 90 degrees from the lower control stop 14 and dimensioned so that it can be inserted into the cross arm so as to engage with the locking ratchets 10.

On the upper bearing 5b of the threaded spindle, a central stop 15 for the cross arm 3 is additionally provided, being mounted firmly on the guide block 5, and also preventing, along with two stopping bolts 16, too wide an opening of the locking ratchets 10.

The operation as depicted in FIG. 4A to G is as follows: only the relevant components are provided with the respective reference numbers.

Raising:

FIG. A shows the roll-bar system in the basic condition with roof closed. The upper control stop 13, retracted into the cross arm 3, holds the locking ratchets 10 in the released state.

After the opening of the roof, the electric motor 7 is activated by the electrical roof controls, the threaded spindle 6 starts turning, the nut 9 initially moves upward by the control stroke, until the lower control stop 14 bears against the bottom of the cross arm. At the same time, the upper control stop has released the locking ratchets 10, which turn into the "locking" position under the action of the torsion springs 11. This condition is shown by FIG. 4B.

As the threaded spindle continues to turn, the nut 9 lying against the cross arm 3 exerts a raising force on the cross arm 3 and thereby raises the roll bar 1 in the cassette 4 or in the guide block 5. Before reaching the uppermost position, the locking ratchets 10 push with their rounded outer contour against the locking bolts 12 (FIG. 4C), firmly mounted in the guide block 5. Upon further raising into the uppermost position (the upper control stop 13 lies against the center stop 15 of the guide block 5), the locking ratchets 10 swing back against the pretensioning force of the torsion springs 11 (FIG. 4D) and then engage with the locking bolts 12 to produce the locking (FIGS. 4E and 5A).

The motor 7 is automatically shut off, e.g., by an end switch.

Stowing Away the Roll Bar:

If the roof of the vehicle is to be opened once more, the electric motor 7 is automatically activated to turn in reversed direction by the roof controls. The threaded spindle 6, turning in the opposite direction, at first moves down by the control stroke. The upper control stop 13 comes to bear against the shoulders 10a of the locking ratchets 10, oriented toward the threaded spindle, and these swivel in the opening direction (FIGS. 4F and 5B). The roll bar is thus ready to retract. Thanks to the threaded spindle 6 continuing to turn, the nut 9 by its upper control stop 13 situated in the cross arm 3 pulls down the cross arm 3 and thus the roll bar 1 until the retracted starting or ground position of the roll bar is reached (FIG. 4G=4A). The electric motor 7 is then shut off automatically, e.g., by means of an end switch.

According to one variant of the embodiment per FIG. 3 to 5, the drive of the threaded spindle can come from above, i.e., the electric motor with transmission is flanged onto the upper end of the threaded spindle and the lower end of the threaded spindle is mounted and able to turn in the cross arm.

Figure 6:
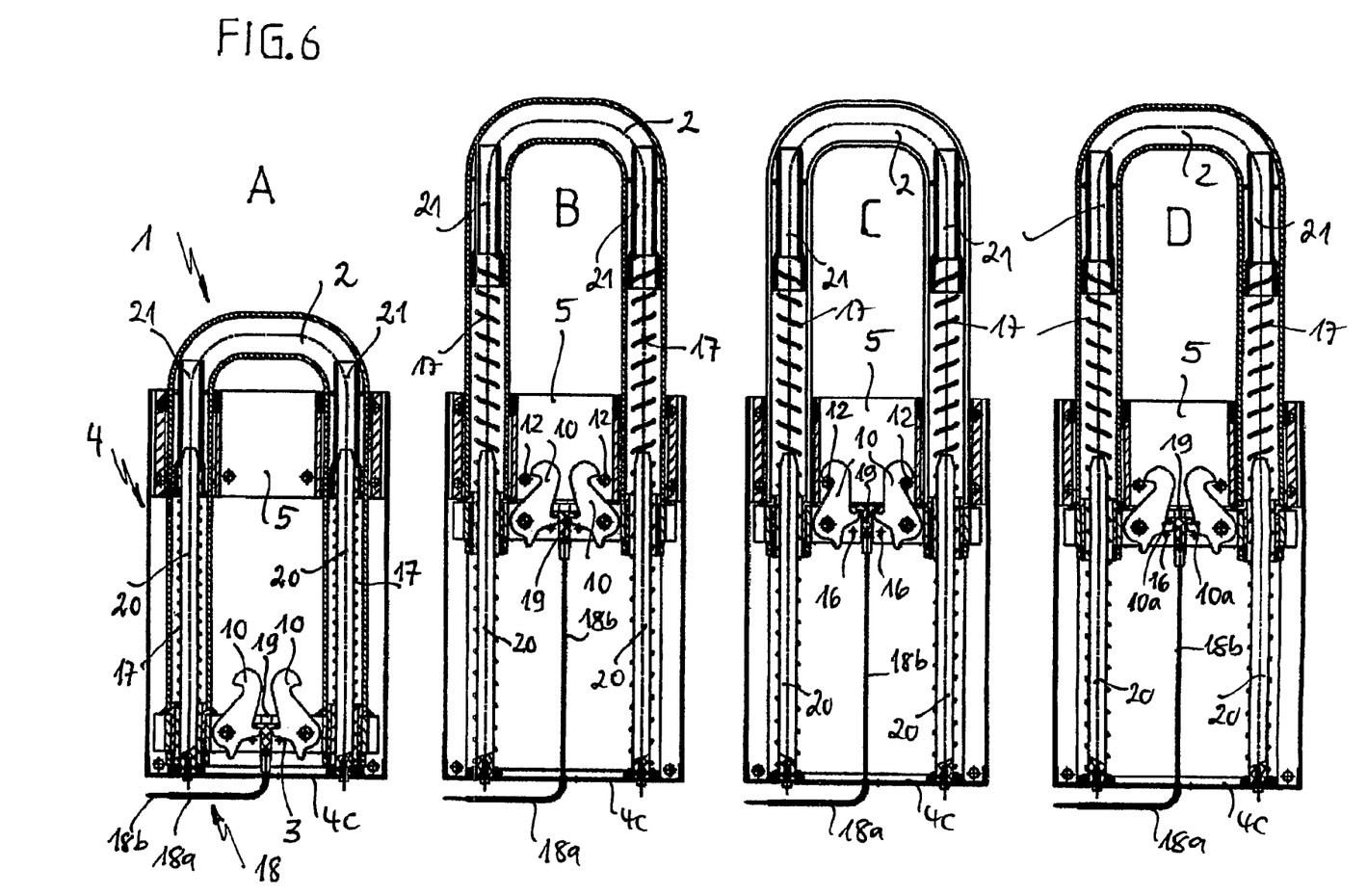

FIG. 6 shows a third embodiment of the invention in four operating states per A-D. The cassette type layout 4 of the roll-bar system with guide block 5, and the locking of the roll bar 1 with cross arm 3 raised into the uppermost position by means of the locking ratchets 10, corresponds to the embodiment per FIG. 3 to 5, and therefore functionally identical components are given the same reference numbers. What is different is the drive system for raising and lowering (resetting) the roll bar 1. Instead of an electric motor type spindle drive, the embodiment of FIG. 6 provides for a raising of the roll bar 1 when the roof is opened with pretensioned lifting springs 17, controlled by a Bowden cable 18, which is mechanically coupled to the roof displacement mechanism, and which also retracts the roll bar into the starting position when the roof is closed. The sheath 18a of the Bowden cable is firmly mounted on the bottom 4c of the cassette housing 4. The free end of the pull cable 18b of the Bowden cable has a T-shaped holding fork 19 with a configuration similar to the nut 9 in the sample embodiment of FIG. 3 to 5. The T-shaped holding fork 19 therefore likewise ensures that the two spring-loaded locking ratchets 10 are in the opened state in the ground condition (FIG. 5A). Furthermore, the T-shaped holding fork 19 holds the roll bar 1 by its cross arm 3 against the force of the two raising springs 17 in the ground condition, because the other end of the corresponding pull cable 18b of the Bowden cable 18 is firmly restrained.

The two raising springs 17 are received into the two legs of the U-shaped bar tube 2 and are guided by spring guide bolts 20 secured to the bottom piece 4c. The two raising springs 17 each thrust against the bottom piece 4c below and against an insert 21 in the upper part of the legs above.

The raising springs 17 are not so-called crash springs, as in the case of sensor-controlled cassette systems. The latter must raise a roll bar in less than half a second in event of an accident. A much larger time span is available for the raising of the raising springs 17 after opening of the roof, e.g., around 5 seconds, so that the spring force can be substantially less, which also allows the roll bar to retract into the ground position when the roof is closed without any additional helping means.

In the context of the opening of the roof, the pull cable 18b is released by the roof displacement mechanism. The cross arm 3 with the bar tube 2 is lifted as the pull cable 18b is pulled out, the locking ratchets being still open (FIG. 5B). After this, the excess stroke of the holding fork 19 is released in the corresponding opening of the cross arm 3, so that the two locking ratchets 10 swing outward under spring force and engage with the locking bolts 12. Thus, as in the sample embodiment of FIG. 3 to 5, the extended roll bar is protected against retraction from the force of a roll-over (FIG. 6C).

Before closing the roof, the pull cable 18b of the Bowden cable is pulled in, controlled by the roof displacement mechanism, and at first travels back over the excess stroke, so that the locking ratchets 10 are again released by the holding fork 19 and rest against the stop bolts 16 (FIG. 5D). Since the T-piece of the holding fork rests against the shoulders 10a of the locking ratchets 10, the pull cable 18b can pull the bar tube into the ground position of FIG. 5A against the force of the lifting springs 17.

Figure 7:
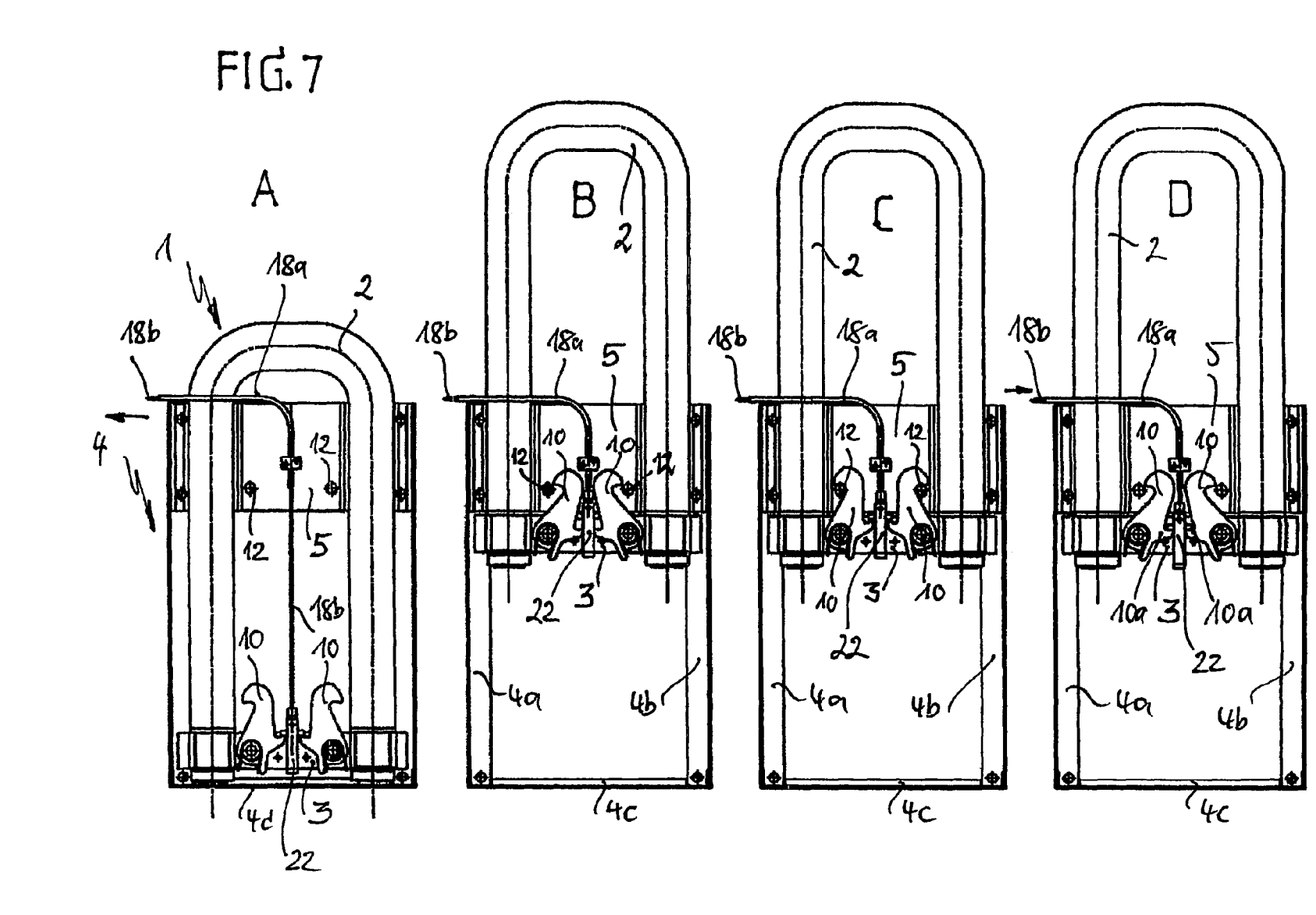

FIG. 7 shows a fourth embodiment of the invention in four operating states per FIG. A-D. The cassette type layout 4 of the roll-bar system with guide block 5, and the locking of the roll bar 1 with cross arm 3 raised into the uppermost position by means of the locking ratchets 10, corresponds to the embodiment per FIG. 3 to 5 and FIG. 6, and therefore functionally identical components are given the same reference numbers.

The fourth embodiment also has an activation of the locking ratchets 10 and the cross arm 3 of the roll bar by means of a Bowden cable 18; thus, it is ultimately a variant of the third embodiment per FIG. 6. In contrast with this third embodiment, the embodiment of FIG. 7 has no lifting springs, i.e., when the roof is opened the roll bar is not automatically raised, but instead it is pulled up by the pull cable 18b of the Bowden cable 18, which is coupled to the roof displacement mechanism, either directly mechanically or indirectly electrically by means of an electric drive such as a winch.

In the ground position (FIG. 7A), the roll bar is not held by a separate device, but rather it is merely "set down" and rests by its own weight against the bottom piece 4c of the housing. Centering pieces 4d per the first embodiment (FIG. 2), not shown in FIG. 7, center the leg tubes of the bar in the ground state.

The sheath 18a of the Bowden cable is secured to the guide block 5, which is fixed to the car body. The pull cable 18b is connected at the pulling end to a T-shaped holding piece 22 and by its other end it is coupled in suitable manner to the roof displacement mechanism. The T-shaped holding piece 22 is configured similar to the T-shaped nut 9 of FIG. 5 with two control stops molded on it and staggered apart by 90 degrees. The method of operation is also similar.

The locking ratchets 10 basically assume the closed position and are only briefly opened for the unlocking.

The embodiment shown in FIG. 7 works as follows:

FIG. 7A shows the roll bar 1 lowered, the lower control stroke has been traveled in the cross arm 3 and the lower control stop of the holding piece 22 has come to bear against the lower edge of the cross arm.

When the roof is opened, the pull cable 18b of the Bowden cable is forcibly pulled inward in the direction of the arrow. In this way, it pulls the cross arm 3 upward by its lower control stop via the holding piece 22 and thus raises the roll bar 1. FIG. 7B shows the raised roll bar just before the highest raised position, i.e., the locking ratchets 10 are just about to engage with the locking bolts 12, which is then attained after a further brief lifting of the cross arm (FIG. C).

To reset the roll bar before closing the roof, the pull cable 18b of the Bowden cable is pulled downward, guided by the roof displacement mechanism. At first, only the T-shaped holding piece is pushed down by the control or switching stroke of around 3-5 mm, until the upper control stop of the holding piece engages with the shoulders 10a of the locking ratchets 10 and opens them (FIG. 7D). The pull cable 18b of the Bowden cable can then push the cross arm 3 with the bar tube 2 downward, and the roll bar assisted by its own weight then retracts into its ground position per FIG. 7A.

The traveling of the control or switching stroke with the control stops of the T-shaped holding piece 22 occurs in detail in the same manner as described by means of FIG. 5.

The foregoing has described a novel kind of roll-bar system with a roll bar which is automatically transported into the active or resting position depending on the opening or closing process of the convertible or sports car roof.

The roll bar has no sensor-controlled crash activation. After opening the roof, the roll bar is automatically lifted into its active position and locked there. Before closing the roof, the roll bar is automatically released and retracted into its resting position. The adjusting of the roll bar is done by a control system coupled to the control system of the roof or by a direct mechanical coupling to the roof drive. Different embodiments have been described, which can be summarized as follows:
1. Lifting and resetting by means of electric motor and spindle, electrically controlled by the roof controls, with two variants in respect of the locking.
2. Lifting by means of lifting springs and resetting as well as control by means of Bowden cable, directly coupled to the roof displacement mechanism.
3. Lifting and control by means of Bowden cable, likewise coupled directly to the resetting/roof displacement mechanism.

The drawings show roll-bar systems with a U-shaped roll bar. In theory, it is also conceivable to have a roll bar in the shape of a box profile, instead of the former. Other locking designs are also conceivable.

LEGEND 1 roll bar
2 U-shaped bar tube
3 cross arm
4 housing
4a,b U-shaped side pieces
4c bottom piece
4d centering pieces
5 guide block
5a inner thread
5b upper bearing of the threaded spindle
6 threaded spindle
7 electric motor
8 transmission
9 nut
9a external thread
10 locking ratchets
10a shoulders
11 torsion springs
12 locking bolts
13 upper control stop
14 lower control stop
15 center stop
16 stopping bolt
17 raising springs
18 Bowden cable
18a sheath
18b pull cable
19 holding fork
20 spring guide bolt
21 insert
22 holding piece

What is claimed is:

1. A roll-bar system for motor vehicles with a roof, which can be extended and retracted in motorized fashion by means of a roof displacement mechanism, consisting of a roll-bar body that is associated with each seat and does not comprise a sensor-controlled crash drive, which can be forcibly displaced autonomously, in conjunction with the roof displacement mechanism, between a first rigid position, when the roof is closed, and a second, raised rigid position, when the roof is open, wherein the roll-bar body is mounted and guided in a cassette type housing that is fixed to the vehicle and said body is associated with a drive, which is coupled to the roof displacement mechanism and used to displace said body vertically in the housing and with a position-dependent forcibly guided locking device, which is used to lock said body in the raised position, wherein the drive for the raising is formed by a spring drive operating in a range of seconds and that for resetting is formed by a Bowden cable coupled to the roof displacement mechanism.

2. The roll-bar system per claim 1, wherein the roll-bar body is formed by a U-shaped tube, whose leg ends are joined together via a cross arm, and the cassette type housing has two U-shaped side pieces, which are joined together at the bottom by a bottom piece, between which a guide block is secured at the top, having openings for guiding the legs of the tube, and in which the ends of the cross arm are introduced.

3. The roll-bar system per claim 2, wherein a compression spring is received inside each of the leg tubes of the U-shaped tube bar, guided by a spring guide bolt firmly arranged on the bottom piece of the housing, and at a pulling end of a pull cable of the Bowden cable there is arranged a T-shaped holding fork, configured T-shaped with two spaced-apart control stops, able to move axially by a predetermined control stroke in the cross arm, able to be guided according to position of the cross arm and to interact with two locking ratchets, so that in the ground condition the holding fork and the rachets hold the cross arm down against the force of the compression springs and in the raised position of the roll bar, the ratchets lock to bolts of the guide blocks and after releasing the locking at the end of the control stroke, the Bowden cable is forcibly guided by the roof displacement mechanism and retracts the raised roll bar.

4. A roll-bar system for motor vehicles with a roof, which can be extended and retracted in motorized fashion by means of a roof displacement mechanism, consisting of a roll-bar body that is associated with each seat and does not comprise a sensor-controlled crash drive, which can be forcibly displaced autonomously, in conjunction with the roof displacement mechanism, between a first rigid position, when the roof is closed, and a second, raised rigid position, when the roof is open, wherein the roll-bar body is mounted and guided in a cassette type housing that is fixed to the vehicle and said body is associated with a drive, which is coupled to the roof displacement mechanism and used to displace said body vertically in the housing and with a position-dependent forcibly guided locking device, which is used to lock said body in the raised position, wherein the drive for both the raising and the resetting is formed by a Bowden cable coupled to the roof displacement mechanism.

5. The roll-bar system per claim 4, wherein the roll-bar body is formed by a U-shaped tube, whose leg ends are joined together via a cross arm, and the cassette type housing has two U-shaped side pieces, which are joined together at the bottom by a bottom piece, between which a guide block is secured at the top, having openings for guiding the legs of the tube, and in which the ends of the cross arm are introduced.

6. The roll-bar system per claim 4, wherein a sheath of the Bowden cable is secured to the guide block and at a pulling end of a pull cable of the Bowden cable there is arranged a T-shaped holding piece, configured T-shaped with two spaced apart control stops, able to move axially by a predetermined control stroke in the cross arm, able to be guided according to position of the cross arm and to interact with two locking ratchets, so that the holding piece after the opening of the roof pulls up the cross arm via released locking ratchets, in the raised position of the roll bar the ratchets are locked to bolts of the guide block and at an end of the control stroke, the cable is forcibly guided by the roof displacement mechanism to release the locking ratchets and pushes the cross arm downward.

7. The roll bar system per claim 6, wherein the roll-bar body is formed by a U-shaped tube, whose leg ends are joined together via a cross arm, and the cassette type housing has two U-shaped side pieces, which are joined together at the bottom by a bottom piece, between which a guide block is secured at the top, having openings for guiding the legs of the tube, and in which the ends of the cross arm are introduced.

8. A roll-bar system for motor vehicles with a roof, which can be extended and retracted in motorized fashion by means of a roof displacement mechanism, consisting of a roll-bar body that is associated with each seat and does not comprise a sensor-controlled crash drive, which can be forcibly displaced autonomously, in conjunction with the roof displacement mechanism, between a first rigid position, when the roof is closed, and a second, raised rigid position, when the roof is open, wherein the roll-bar body is mounted and guided in a cassette type housing that is fixed to the vehicle and said body is associated with a drive, which is coupled to the roof displacement mechanism and used to displace said body vertically in the housing and with a position-dependent forcibly guided locking device, which is used to lock said body in the raised position, wherein the drive for both the raising and resetting is formed by an electric motor actuated nut and thread type spindle drive, electrically connected to the roof displacement mechanism, wherein the threaded spindle of the drive is mounted in the housing so as to move in rotation, but not shift axially, and the nut mounted on the threaded spindle can rotate and is connected to the roll-bar body and wherein the thread spindle is mounted and can turn by one end on the guide block and by the other end on the bottom piece of the housing, and the corresponding nut is mounted on a cross arm, on which the electric motor with corresponding transmission is also placed, wherein the nut of the nut/threaded spindle drive is mounted on the cross arm able to rotate and connected to a take-off shaft of an electric gear motor, and wherein the nut is cylindrically configured and also has an external thread and a corresponding inner thread is arranged in the guide block in an upper bearing region of the threaded spindle to screw in the external thread of the nut in the raised position of the roll bar for locking of the roll bar, and a pitch per turn of the thread of the threaded spindle is equal to that of the locking thread.

9. A roll-bar system for motor vehicles with a roof, which can be extended and retracted in motorized fashion by means of a roof displacement mechanism, consisting of a roll-bar body that is associated with each seat and does not comprise a sensor-controlled crash drive, which can be forcibly displaced autonomously, in conjunction with the roof displacement mechanism, between a first rigid position, when the roof is closed, and a second, raised rigid position, when the roof is open, wherein the roll-bar body is mounted and guided in a cassette type housing that is fixed to the vehicle and said body is associated with a drive, which is coupled to the roof displacement mechanism and used to displace said body vertically in the housing and with a position-dependent forcibly guided locking device, which is used to lock said body in the raised position, wherein the drive for both the raising and resetting is formed by an electric motor actuated nut and thread type spindle drive, electrically connected to the roof displacement mechanism, wherein the threaded spindle of the drive is mounted in the housing so as to move in rotation, but not shift axially, and the nut mounted on the threaded spindle can rotate and is connected to the roll-bar body and wherein the thread spindle is mounted and can turn by one end on the guide block and by the other end on the bottom piece of the housing, and the corresponding nut is mounted on a cross arm, on which the electric motor with corresponding transmission is also placed, wherein the threaded spindle of the nut/threaded spindle drive is connected to a take-off shaft of an electric gear motor and the nut is mounted on the cross arm firm against rotation, and wherein the nut is configured T-shaped with two spaced-apart control stops, staggered by 90 degrees, and mounted on the cross arm firm against rotation, in order to move axially by a predetermined control stroke.

10. The roll-bar system per claim 9, wherein two spring-loaded locking ratchets are also pivoted in the cross arm, being positionally controlled by the control stops of the nut to be brought into a locking interaction with matching lock bolts, firmly arranged on the guide block.

* * * * *